(12) United States Patent
Doux et al.

(10) Patent No.: US 12,668,357 B2
(45) Date of Patent: Jun. 30, 2026

(54) VARIABLE-LENGTH LANDING GEAR AND AIRCRAFT EQUIPPED WITH SUCH A LANDING GEAR

(71) Applicant: SAFRAN LANDING SYSTEMS, Velizy-Villacoublay (FR)

(72) Inventors: Aurélien Doux, Moissy-Cramayel (FR); Vincent Pavoine, Moissy-Cramayel (FR); Philippe Henrion, Moissy-Cramayel (FR); Sébastien Dubois, Moissy-Cramayel (FR)

(73) Assignee: SAFRAN LANDING SYSTEMS, Vélizy-villacoublay (FR)

( * ) Notice: Subject to any disclaimer, the term of this patent is extended or adjusted under 35 U.S.C. 154(b) by 0 days.

(21) Appl. No.: 18/838,747

(22) PCT Filed: Feb. 16, 2023

(86) PCT No.: PCT/EP2023/053870
§ 371 (c)(1),
(2) Date: Aug. 15, 2024

(87) PCT Pub. No.: WO2023/156511
PCT Pub. Date: Aug. 24, 2023

(65) Prior Publication Data
US 2025/0229894 A1 Jul. 17, 2025

(30) Foreign Application Priority Data
Feb. 17, 2022 (FR) ...................................... 2201431

(51) Int. Cl.
B64C 25/20 (2006.01)
B64C 25/12 (2006.01)
(Continued)

(52) U.S. Cl.
CPC .............. B64C 25/20 (2013.01); B64C 25/12 (2013.01); B64C 25/26 (2013.01); B64C 25/60 (2013.01)

(58) Field of Classification Search
CPC ......... B64C 25/12; B64C 25/20; B64C 25/58; B64C 25/60; B64C 2025/008
See application file for complete search history.

(56) References Cited

U.S. PATENT DOCUMENTS

| 2,974,909 A | * | 3/1961 | Perdue | B64C 25/12 |
| | | | | 244/102 R |
| 3,198,461 A | * | 8/1965 | Beach | B64C 25/20 |
| | | | | 244/102 R |

(Continued)

FOREIGN PATENT DOCUMENTS

| EP | 0564772 A1 | * | 10/1993 | | B64C 25/12 |
| FR | 2 393 726 A1 | | 1/1979 | | |

(Continued)

OTHER PUBLICATIONS

International Search Report mailed Apr. 19, 2023, issued in corresponding International Application No. PCT/EP2023/053870, filed Feb. 16, 2023, 5 pages.

(Continued)

*Primary Examiner* — Joseph W Sanderson
(74) *Attorney, Agent, or Firm* — CHRISTSEN O'CONNOR JOHNSON KINDNESS PLLC

(57) ABSTRACT

A landing gear includes a supporting structure, and a damping cylinder connected to a lever which is hinged to the supporting structure about a hinge axis. The lever is movable between a towards end position, in which the wheel is moved towards the hinge axis, and an away end position, in which the wheel is moved away from the hinge axis. The towards and away end positions are on either side of an intermediate position, in which the lever and the cylinder are (Continued)

aligned. The end away position is defined by a stop secured to the supporting structure and against which the lever in the away position is applied to take up the landing forces.

16 Claims, 2 Drawing Sheets

(51) Int. Cl.
B64C 25/26 (2006.01)
B64C 25/60 (2006.01)

(56) References Cited

U.S. PATENT DOCUMENTS

| | | | | |
|---|---|---|---|---|
| 3,870,254 | A | 3/1975 | Watts | |
| 4,199,119 | A * | 4/1980 | Masclet | B64C 25/12 |
| | | | | 244/102 R |
| 4,312,485 | A * | 1/1982 | Masclet | B64C 25/12 |
| | | | | 244/102 R |
| 5,337,976 | A * | 8/1994 | Derrien | B64C 25/14 |
| | | | | D12/345 |
| 5,478,030 | A * | 12/1995 | Derrien | B64C 25/12 |
| | | | | 244/102 R |
| 7,007,891 | B2 * | 3/2006 | Ducos | B64C 25/001 |
| | | | | 244/102 R |
| 8,800,920 | B2 * | 8/2014 | Ducos | B64C 25/12 |
| | | | | 244/102 A |
| 10,384,767 | B2 * | 8/2019 | Cottet | B64C 25/10 |
| 10,967,959 | B2 * | 4/2021 | Allwein | B64C 25/10 |
| 10,981,646 | B2 * | 4/2021 | Alley | B64C 25/20 |
| 2005/0011991 | A1 * | 1/2005 | Ducos | B64C 25/58 |
| | | | | 244/102 R |
| 2013/0020436 | A1 * | 1/2013 | Ducos | B64C 25/12 |
| | | | | 244/102 A |
| 2018/0208298 | A1 * | 7/2018 | Cottet | B64C 25/12 |
| 2019/0002089 | A1 | 1/2019 | Thompson | |
| 2020/0031457 | A1 * | 1/2020 | Alley | B64C 25/34 |
| 2021/0394890 | A1 | 12/2021 | Cottet | |

FOREIGN PATENT DOCUMENTS

| | | | | |
|---|---|---|---|---|
| FR | 2 702 732 | A1 | 9/1994 | |
| FR | 3018501 | A1 * | 9/2015 | ............. B64C 25/60 |
| GB | 2101542 | A * | 1/1983 | ............. B64C 25/58 |

OTHER PUBLICATIONS

Written Opinion mailed Apr. 19, 2023, issued in corresponding International Application No. PCT/EP2023/053870, filed Feb. 16, 2023, 6 pages.

* cited by examiner

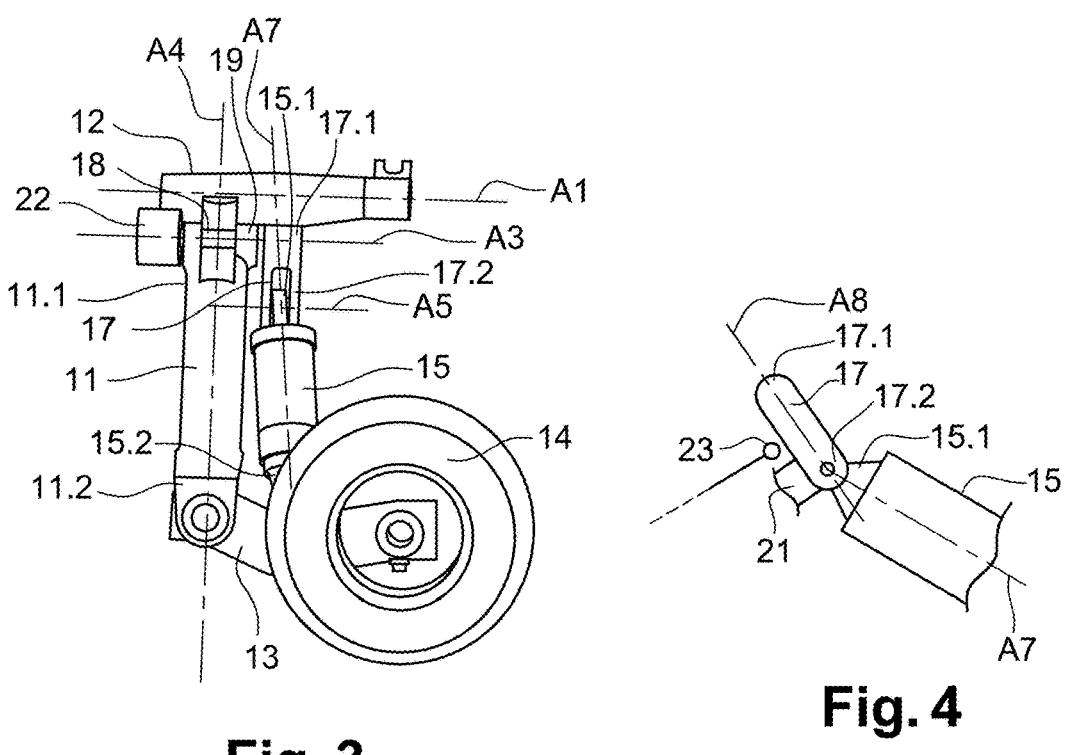
Fig. 3
Fig. 4
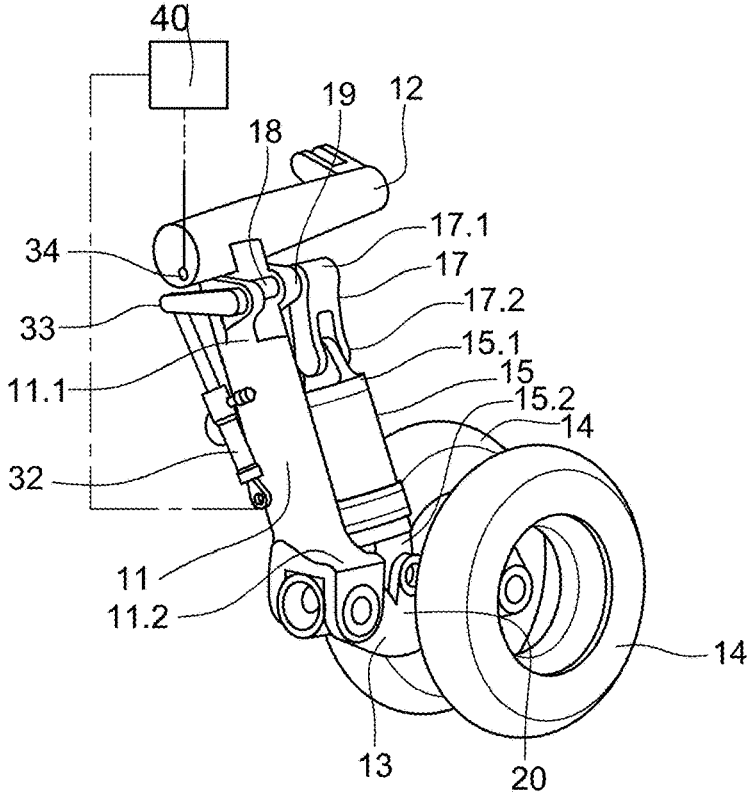
Fig. 5

VARIABLE-LENGTH LANDING GEAR AND AIRCRAFT EQUIPPED WITH SUCH A LANDING GEAR

FIELD OF THE DISCLOSURE

The present disclosure relates to the field of aircraft undercarriages, and more specifically, retractable or returning undercarriages.

BACKGROUND

An undercarriage conventionally comprises one or more landing gears, each comprising a supporting structure which comprises, for example, a strut having a first end secured to a hinge shaft, to an aircraft structure, and a second end carrying a rocker lever at an end of which the wheel is fastened. A damping cylinder extends between the strut and the rocker lever to dampen the movements of the rocker lever during landing.

The supporting structure is movable between an output position, in which the strut of the landing gear extends substantially vertically and a returned position, in which the landing gear is housed in a hold of the aircraft closed by a door.

The hold generally has a relatively restricted and bulky volume which sometimes obligates the distance between the wheel and the hinge of the strut to the structure of the aircraft to be reduced, during the raising of the landing gear. Such an arrangement is, for example, illustrated in document FR-A-2702732. This document describes a set of connecting rods connected, on the one hand, to the damping cylinder, and on the other hand, to the structure of the aircraft, such that the movement of the landing gear from its output position to its returned position also causes a movement of the first end of the cylinder causing the wheel, with respect to the hinge of the strut, to move closer to the structure of the aircraft. This arrangement of connecting rods is however relatively complex and requires adjusting the length of the connecting rods on each aeroplane. Furthermore, an attachment point of one of the connecting rods of the set must be provided in the hold, to ensure the synchronisation of the wheel moving closer to the hinge of the strut, and the movement of the strut with respect to the structure of the aircraft.

The disclosure in particular aims to propose a simple means to optimise the housing of a landing gear in a hold of reduced volume.

SUMMARY

To this end, a landing gear is provided, according to the disclosure, comprising a supporting structure and a damping cylinder having a first end connected by a hinge member to the supporting structure and a second end connected to a wheel. The hinge member comprises a lever having a first end which is hinged to the supporting structure about a first hinge axis and a second end which is hinged to the cylinder about a second hinge axis, such that the lever pivots about the first hinge axis between an end position, in which the wheel is moved towards the first hinge axis, and an end position, in which the wheel is moved away from the first hinge axis, the end positions being on either side of an intermediate position, in which the lever and the cylinder are aligned, and the end away position being defined by a stop secured to the supporting structure and against which the lever in the away position is applied to take up the landing forces transmitted along a longitudinal axis of the cylinder.

The landing gear further comprises an actuator connected to the lever and to the supporting structure to move the lever between its two end positions.

Thus, the actuator makes it possible to modify the distance between the wheel and the hinge of the supporting structure to the structure of the aircraft and it is integrated with the landing gear such that it is not necessary to provide a specific attachment point in the hold. In addition, the modification of the length of the damping cylinder is adjustable directly by acting on the control of the actuator, which limits the adjustment operations during the installation of the landing gear in the hold of the aircraft. Furthermore, the actuator and the lever can have a relatively compact structure due to their integration on the landing gear, such that their size is not damaging to the implantation of the landing gear in the hold. Finally, the landing forces are transmitted by the cylinder to the supporting structure via the lever which is abutted against the supporting structure: the actuator does not need to be sized to support these forces, which contributes to limiting the overall size of the landing gear.

The disclosure also aims for an aircraft provided with at least one such landing gear.

Other features and advantages of the disclosure appear upon reading the following description of a particular and nonlimiting embodiment of the disclosure.

DESCRIPTION OF THE DRAWINGS

Reference is made to the accompanying drawings, among which:

FIG. 3 is a side, schematic view of a landing gear according to the first embodiment of the disclosure;

FIG. 4 is a front, partial, schematic view of a landing gear according to the first embodiment of the disclosure, showing more specifically the hinge member of the cylinder to the supporting structure;

FIG. 5 is a perspective, schematic view of a landing gear according to a second embodiment of the disclosure.

DETAILED DESCRIPTION

Figure 1:
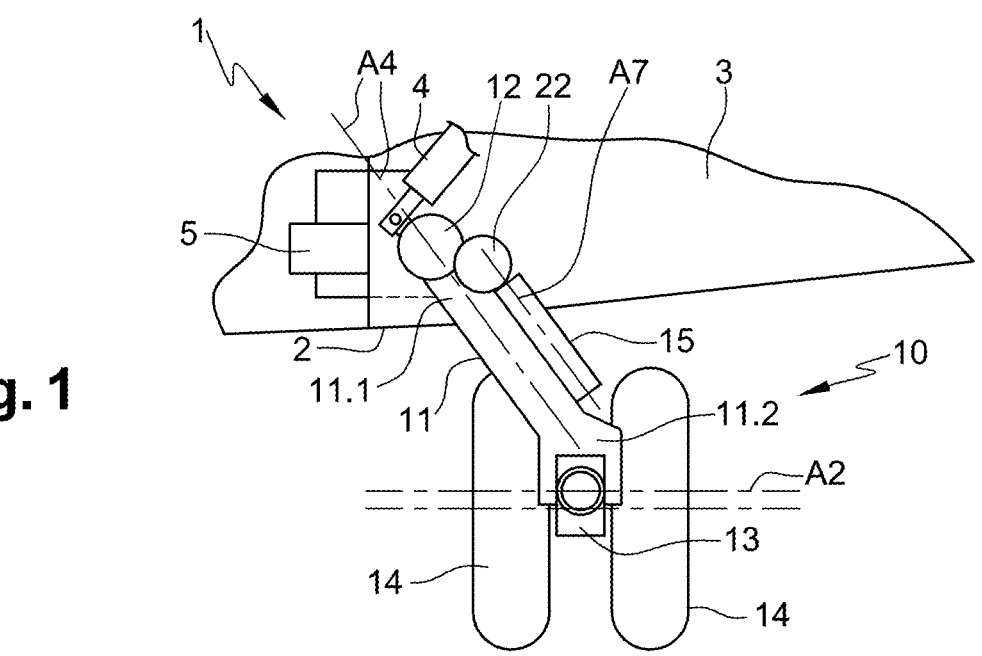
FIG. 1 is a front, partial, schematic view of a landing gear installed on an aircraft according to the disclosure.

FIG. 1 represents an aircraft 1 comprising a structure 2, in which two holds 3 are provided, arranged to each receive a landing gear generally referenced 10 (only one part of the wing of the aircraft 1 and the associated hold 3 can be seen, in this case).

Each landing gear 10 comprises a strut 11 having a first end 11.1 and a second end 11.2.

The first end 11.1 is secured to a hinge shaft 12 of the strut 11 to the structure 2 of the aircraft 1 in one of the holds 3. The shaft 12 can have one or two ends arranged in a trunnion to each be received in a bearing of the hold 3, or comprise one or more clevises to be connected by an axis to the structure 2, such that the strut 11 pivots with respect to the structure 2 about an axis A1, in this case, substantially parallel to the shaft 12. The hinge of the strut 11 to the structure 2 of the aircraft 1 is known in itself and will not be detailed further, in this case.

The strut 11 comprises a second end 11.2 to which an end 13.1 of a rocker lever 13 having an end 13.2 provided with an axle carrying two rotary wheels 14 is fastened to pivot about an axis A2. The axle and the pivot axis A2 of the rocker lever 13 are parallel to one another.

The strut 11, the shaft 12 and the rocker lever 13 form a supporting structure, which is mounted on the structure 2 to pivot about the axis A1 between a returned position, in which the landing gear 10 is housed in the hold 3 during the flight of the aircraft 1 and an output or descended position in which the landing gear 10 extends substantially outside of the hold 3 to support the aircraft 1 during taxiing on the ground, take-off and landing phases. The movement of the supporting structure between these two positions is ensured by an actuator referenced 4 and connected to a control device 5. The control device 5 is, in this case, an electronic unit connected to position sensors of the landing gear 10 with respect to the structure 2 and the actuator 5 is, in this case, an electromechanical actuator known in itself. The actuation of the landing gear 10 enters its returned and output positions is known in itself and will not be detailed further, in this case. Other control and actuation means of the landing gear, for example, electrohydraulic, can naturally be used.

Each landing gear 10 further comprises a damping cylinder 15 arranged to dampen the pivot movements of the rocker lever 13 about the axis A2.

In reference also to FIGS. 2 to 5, the damping cylinder 15 comprises a first end 15.1 connected to a hinge member generally referenced 16 mounted on the strut 11 and a second end 15.2 hinged to the rocker lever 13. More specifically, the first end 15.1 is, in this case, an eye secured to the body of the damping cylinder 15 and the second end 15.2 is an eye secured to the rod of the damping cylinder 15.

The hinge member 16 comprises a lever 17 having a first end 17.1 secured to a shaft 18 pivotally mounted in a bearing 19 radially projectingly extending from the strut 11 to define a pivot axis A3 substantially perpendicular to a longitudinal axis A4 of the strut 11 and to the axis A2. The lever 17 has a second end 17.2 shaped in a clevis receiving the eye of the first end 15.1 of the damping cylinder 15 to form a hinge of axis A5 parallel to the axis A3. The eye of the first end 15.1 comprises a ball ensuring a spherical connection of the body of the damping cylinder 15 with respect to the second end 17.2 of the lever 17.

The second end 17.2 of the damping cylinder 17 is connected to a hinge 20 (a supporting clevis of a hinge axis) secured to the rocker lever 13 to define a pivot axis A6 parallel to the axis A2. The eye of the second end 15.2 comprises a ball ensuring a spherical connection of the rod of the damping cylinder 15 with respect to the rocker lever 13.

It is understood that the lever 17 pivots about the axis A3 between an end towards position of the wheels 14 to the axis A1 and an end away position of the wheels 14 with respect to the axis A1. The end positions located on either side of an intermediate position, in which the damping cylinder 15 and the lever 17 are aligned, i.e. that the axes A3 and A5 are secant with a longitudinal axis A7 of the damping cylinder 15 (the axes A3, A5 and A7 extending into one same plane also containing a longitudinal axis A8 of the lever 17).

The end away position is defined by a stop 21 secured to the supporting structure 2, and more specifically in this case to the strut 11, and against which the lever 17 in the away position is applied to take up landing forces transmitted by the cylinder 15 parallel to its longitudinal axis A7. It can be seen in FIG. 4 that, when the lever 17 bears against the stop 21, the axes A7 and A8 form a non-zero angle to one another, the axis A7 being inclined towards the stop 21, such that the forces transmitted by the cylinder 15 along the direction A7 tend to apply the end 17.2 of the lever against the stop 21.

Figure 2:
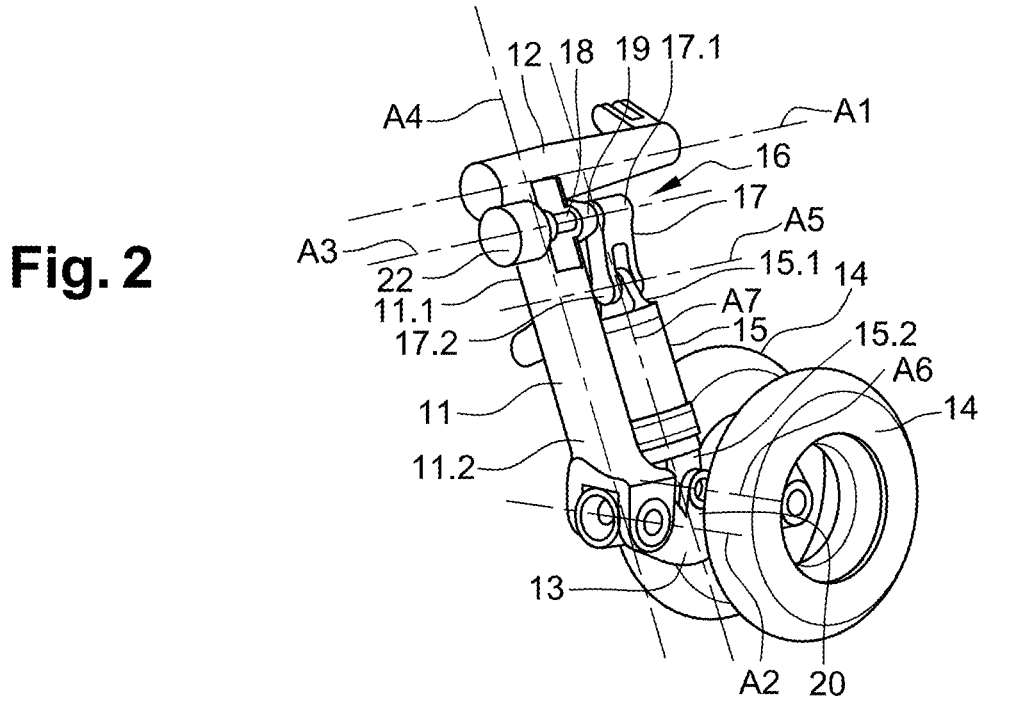
FIG. 2 is a perspective, schematic view of a landing gear according to a first embodiment of the disclosure.

In reference to FIGS. 2 to 4 and according to the first embodiment, the movement of the lever 17 between its two end positions is ensured by a rotary actuator 22, in this case, electromechanical. The rotary actuator 22 comprises an electric motor having a stator secured to the end 11.1 of the strut and an output shaft rotatably connected to the shaft 18. The output shaft is, in this case, coaxial to the shaft 18. The actuator 22 thus extends between the lever 17 and the supporting structure and is connected to the control device 5 to be controlled by it.

The landing gear 10 further comprises, in this case, a position sensor 23 which is mounted on the strut 11 and detects the arrival of the lever 17 bearing against the stop 21. The position sensor 23 is connected to the control device 5 to provide signals to the control device 5, making it possible for the control device 5 to control the actuator 22. Preferably, a second position sensor is also provided, which cannot be seen in the figures, which is mounted on the strut 11 and detects the arrival of the lever 17 in the end towards position. The position sensors facilitate the controlling of the rotary actuator 22 which is controlled by the control device 5 to bring the lever 17 to the towards position during the raising of the landing gear, and to bring the lever 17 to the away position during the descent of the landing gear. In a variant, an angular coder can also be used, for example of the RVDT type, integrated in the motor or driven by it so as to determine the angular position of the output shaft of the rotary actuator 22 and deduce from it, the position of the lever 17. It is also possible to detect the arrival of the abutted lever by monitoring the power supply current of the motor of the rotary actuator 22.

It will be noted that it is possible to control the rotary actuator 22 independently of the actuator 4. The start of movement instant of the lever 17 with respect to the start or end movement instant of the landing gear between its two positions can therefore be chosen, according to the duration of the movement of the lever 17 between its two end positions and the duration of the movement of the landing gear between its returned and output positions. For example:

the lever 17 starts its movement to the towards position just before or after the landing gear starts its movement to the returned position, or the lever 17 starts its movement to the towards position to arrive in the towards position just before the landing gear arrives in the returned position.

In a variant, it could also be considered to control the rotary actuator 22 to return the lever 17 into the away position just after the landing gear 10 has arrived in the returned position. In this case, it is also provided to move the lever 17 into the towards position just before damping the movement of the landing gear 10 to the output position then of bringing it into the away position, once the landing gear 10 exits from the hold.

Preferably, a sensor will also be provided to detect if the cylinder 15 is charged (when the wheels 14 are also in contact with the ground), such that the lever 17 cannot be controlled to its towards position while the cylinder 15 is compressed.

In the second embodiment represented in FIG. 5, the rotary actuator 22 is replaced by a linear actuator 32, also electromechanical, in this case. The linear actuator 32 has a first part, in this case the body, connected to the supporting structure, in this case the strut 11, and a second part, in this case the rod, connected to the lever 17. More specifically, the second part of the actuator 32 is hinged to a lug 33 which projectingly extends from the shaft 18 rotatably connecting the lug 33 to the first end 17.1 of the lever 17.

The landing gear 10 further comprises, in this case, a position sensor 34 which is mounted on the strut 11 and detects the arrival of the lug 34 in each of its positions 34 corresponding to the end away and towards positions of the lever 17. The position sensor 34 is, for example, a magnetic sensor of the Hall effect type and it is connected to an electronic unit 40 for controlling the linear actuator 32. In a variant, it is possible to detect the positions of the rod of the linear actuator 32 with respect to the body of the actuator, for example, by a linear sensor of the LVDT type. As above, the position sensors facilitate the controlling of the linear actuator 32, which is controlled by the control device 5 to bring the lever 17 to the towards position during the raising of the landing gear, and to bring the lever 17 to the away position during the descent of the landing gear.

The disclosure is not limited to the described embodiments but covers any variant coming within the scope of the disclosure as defined by the claims.

In particular, the landing gear and the aircraft can have a different structure from that described.

The landing gear can comprise one or more wheels, one or more axles.

The landing gear can have a rocker lever or not.

The actuators can be electromechanical, electrofluidic or fluidic actuators.

The landing gear can comprise a single control device to control all the actuators of the landing gear, or several control devices (or units), one of which dedicated to the controlling of the actuator of the lever 17.

The actuator 22, 32 can integrate an electronic control board.

The position detectors of the lever 17 can be fastened to the shaft 12.

The actuators 22, 32 can each be equipped with at least one rotary or linear potentiometer to ensure a position detection of the movable element of the actuator.

Towards/away sequences other than those described can be considered.

The invention claimed is:

1. A landing gear, comprising:
   a supporting structure;
   a rocker lever hinged to an end of the supporting structure, said rocker having an end carrying a wheel; and
   a damping cylinder having a first end connected by a hinge member to the supporting structure and a second end connected to the rocker lever,
   wherein the hinge member comprises a lever having a first end which is hinged to the supporting structure about a first hinge axis and a second end which is hinged to the cylinder about a second hinge axis, such that the lever pivots about the first hinge axis between an end towards position, in which the wheel is moved towards the first hinge axis to allow the landing gear to be housed in a hold, and an end away position, in which the wheel is moved away from the first hinge axis, the end towards position and end away position being on either side of an intermediate position, in which the lever and the cylinder are axially aligned, and the end away position being defined by a stop secured to the supporting structure and against which the lever in the end away position is applied to take up the landing forces transmitted along a longitudinal axis of the cylinder when the landing gear extends outside the hold, and in that the landing gear comprises an actuator connected to the lever and to the supporting structure to move the lever between the end towards position and the end away position.

2. The landing gear according to claim 1, wherein the actuator is a rotary actuator having an output shaft rotatably connected to the first end of the lever.

3. The landing gear according to claim 1, wherein the actuator is a linear actuator having a first part connected to the supporting structure and a second part connected to the lever.

4. The landing gear according to claim 3, wherein the second part of the linear actuator is connected to a lug which projectingly extends from a shaft extending along the first hinge axis, said shaft rotatably connecting the lug to the first end of said lever.

5. The landing gear according to claim 1, wherein the actuator is an electromechanical actuator.

6. The landing gear according to claim 1, wherein:
   the supporting structure comprises a strut having a first end secured to a hinge shaft to an aircraft structure and a second end carrying a rocker lever at an end of which the wheel is fastened,
   the hinge member being mounted on the strut and the second end of the cylinder being hinged on the rocker lever, and
   the actuator has a part mounted on the strut.

7. The landing gear according to claim 1, further comprising an electronic control unit of the actuator and at least one first position sensor connected to the electronic control unit to control the actuator according to signals coming from the sensor.

8. The landing gear according to claim 7, wherein the first position sensor is arranged to detect a position of the lever.

9. The landing gear according to claim 7, wherein the first position sensor is arranged to detect a position of a movable part connected to the lever.

10. The landing gear according to claim 7, wherein the electronic control unit is connected to a second position sensor of the supporting structure with respect to an aircraft structure.

11. An aircraft comprising a structure and at least one landing gear according to claim 1, the supporting structure of the landing gear being hinged on the structure of the aircraft.

12. The aircraft according to claim 11, further comprising an electronic control device of the landing gear configured to move the landing gear between a returned position in a hold of the aircraft and an output position, the control device being connected to the actuator to control it so as to move the lever between the end towards position and the end away position so that the lever is in the end towards position when the landing gear is in the returned position and in the end away position when the landing gear is in the output position.

13. The aircraft according to claim 12, wherein the electronic control device is arranged to bring the lever into the end towards position before controlling the movement of the landing gear to the returned position.

14. The aircraft according to claim 13, wherein the electronic control device is arranged to bring the lever into the end towards position during the movement of the landing gear to the returned position.

15. A landing gear comprising:
   a supporting structure,
   a rocker lever that is hinged to an end of the supporting structure and has an end carrying a wheel, and
   a damping cylinder having a first end connected by a hinge member to the supporting structure and a second end connected to the rocking lever, wherein the hinge member comprises a lever having a first end which is hinged to the supporting structure about a first hinge axis and a second end which is hinged to the cylinder about a second hinge axis, such that the lever pivots about the first hinge axis between an end towards position, in which the wheel is moved towards the first hinge axis, and an end away position, in which the wheel is moved away from the first hinge axis, the end towards position and end away position being on either side of an intermediate position, in which the lever and the cylinder are aligned, the lever and the damping cylinder having longitudinal axes forming a non-zero angle to one another when the lever is the end away position and the end away position being defined by a stop secured to the supporting structure in such a way that, when the lever is in the end away position, the longitudinal axis of the cylinder is inclined towards the stop such that the landing forces transmitted along the longitudinal axis of the cylinder tend to apply the lever against the stop, and in that the landing gear comprises an actuator connected to the lever and to the supporting structure to move the lever between the end towards position and the end away position.

16. A landing gear comprising:
a supporting structure, a rocker lever that is hinged to an end of the supporting structure and has an end carrying a wheel, and a damping cylinder having a first end connected by a hinge member to the supporting structure and a second end connected to the rocking lever, wherein the hinge member comprises a lever having a first end secured to a shaft pivotally mounted on the supporting structure about a first hinge axis and a second end which is hinged to the cylinder about a second hinge axis, such that the lever pivots about the first hinge axis between an end towards position, in which the wheel is moved towards the first hinge axis, and an end away position, in which the wheel is moved away from the first hinge axis, the end towards position and end away position being on either side of an intermediate position, in which the lever and the cylinder are aligned, and the end away position being defined by a stop secured to the supporting structure and against which the lever in the end away position is applied to take up the landing forces transmitted along a longitudinal axis of the cylinder, and in that the landing gear comprises an actuator connected to the shaft and to the supporting structure to pivot the shaft to move the lever between the end towards position and the end away position.

\* \* \* \* \*